Aug. 8, 1967 R. I. HARRISON ET AL 3,335,373

APPARATUS FOR MODULATING GUIDED ELECTROMAGNETIC WAVES

Filed July 20, 1964 2 Sheets-Sheet 1

INVENTORS.
RICHARD I. HARRISON
JOSEPH ZUCKER

BY R. J. Frank

ATTORNEY.

INVENTORS.
RICHARD I. HARRISON
JOSEPH ZUCKER
BY
R. J. Frank
ATTORNEY.

United States Patent Office 3,335,373
Patented Aug. 8, 1967

3,335,373
APPARATUS FOR MODULATING GUIDED ELECTROMAGNETIC WAVES

Richard I. Harrison, Jericho, and Joseph Zucker, New York, N.Y., assignors to General Telephone and Electronics Laboratories, Inc., a corporation of Delaware Filed July 20, 1964, Ser. No. 383,826
9 Claims. (Cl. 332—29)

ABSTRACT OF THE DISCLOSURE

An electromagnetic cavity in which one wall is formed of semiconductor material. The application of a signal between first and second spaced contacts affixed to the wall varies the conductivity of the wall and thereby changes the Q and the resonant frequency of the cavity.

This invention relates to the modulation of guided electromagnetic waves, and more particularly, to the modulation thereof by the variation of the transmission characteristics of an electromagnetic cavity in accordance with a modulating signal.

The increasing use of high frequencies for the transmission of electromagnetic energy has created a need for new apparatus and methods for modulating, attenuating, and filtering electromagnetic waves at frequencies extending well into the gigacycle range. This need is also seen from the present development of telephone systems utilizing pulse modulation of high frequency carriers for transmission.

Although devices performing these operations at high frequencies are known, they are generally complex, not easy to manufacture and consequently expensive. Since many high frequency systems using millimeter waves are intended to ultimately replace existing systems, acceptance thereof is predicated in part upon the cost and ease of manufacturing reliable devices for use therein.

The known devices generally rely on the effects produced by a semiconductor junction poistioned within a waveguide or cavity. The semiconductor and its contacts are held in a specially adapted mount for insertion into the fields present within the waveguide. Thus, the semiconductor junction is directly exposed to the high frequency carrier and burn-out due to the limited power handling capabilities of the junction frequently occurs. In addition, the frequency response of junction-type devices is generally limited by the carrier recombination time of the semiconductor material.

The present invention relates to a device that is capable of modulating, attenuating and filtering guided electromagnetic waves in accordance with a modulating or control signal. Accordingly, it is an object of the present invention to provide a single device capable of performing these operations that is rugged, reliable and easy to manufacture.

A further object is the provision of a modulator having greater power handling capabilities than known devices performing similar operations.

Another object is to provide a modulator having a control frequency response that is substantially higher than known devices.

Another object is to provide an improved method for modulating, attenuating and filtering high frequency guided electromagnetic waves.

Still another object is the provision of a modulator in which the need for a waveguide mount is obviated.

This invention is concerned with the modulation of guided electromagnetic waves by the controlled variation of the transmission characteristics of a waveguide cavity having one wall formed of semiconductor material. The semiconductor wall is provided with two contacts mounted on opposing edges and located outside the electromagnetic fields present in the cavity. The application of a control or modulating voltage therebetween results in a corresponding electric field within the semiconductor wall.

The electric field varies the conductivity of the semiconductor wall, resulting in a change in the total energy storage and dissipation of the cavity which in turn, results in a variation of the transmitted power characteristic. These effects can be used to modulate, attenuate or filter the electromagnetic waves in the cavity.

The cavity is designed to resonate at the particular frequency of interest in the absence of a control voltage applied to the semiconductor wall contacts. As known in the art, a cavity has a characteristic parameter, termed the unloaded Q, which is defined as the ratio of the electromagnetic energy stored per cycle and the energy lost per cycle measured at the resonant frequency. By increasing the conductivity of the semiconductor wall, the energy lost per cycle is decreased since the currents induced in the wall by the fields within the cavity encounter less dissipative resistance. In addition, the energy storage in the semiconductor wall also decreases. However, in terms of the Q, the decrease in energy loss per cycle dominates and thus, the Q increases with an increase in semiconductor wall conductivity. Since the Q determines the peak amplitude of the transmission characteristic, an increase in the value of Q increases the peak amplitude and varies the shape of the transmission characteristic.

Also, the increase in conductivity provides an increase in the resonant frequency which shifts the mid-point of the transmission characteristic. The conductivity increase is found to have an effect similar to a decrease of the physical dimensions of the cavity and since the resonant frequency of a cavity is determined essentially by its geometry, the resonant frequency of the cavity is increased. For a decrease in semiconductor conductivity, the losses in the wall increase thereby resulting in a lower Q, which varies the shape of the characteristic, and a decreased resonant frequency.

The variation in the shape of the cavity transmission characteristic and the movement thereof along the frequency axis results in greater or lesser amounts of output power from the cavity depending upon the type of contact employed. For embodiments employing injecting-type contacts, the conductivity of the semiconductor wall is increased due to the injection of minority carriers therein. However, embodiments having ohmic contacts utilize the decrease in carrier mobility resulting from the heating of the carriers by the applied electric field to decrease the conductivity of the semiconductor wall.

The control voltage may be either a pulse or a varying modulation signal and, the cavity output is modulated accordingly. In addition, the device may be operated as a variable attenuator or filter by the application of a constant control voltage to the contacts.

The semiconductor wall may be used with any cavity geometry and is selected to have a thickness greater than a skin-depth at the frequency of interest. This decreases the losses arising from the inability of a semiconductor wall to completely contain the cavity fields, as the power loss due to leakage is an inverse function of the wall thickness. Also, the semiconductor carrier concentration is preferably chosen to not exceed $10^{16}$ carriers per cubic centimeter at room temperatures. This low carrier concentration enhances the sensitivity of the device as the conductivity of the semiconductor may be decreased by the heating of the carriers by the applied electric field to a temperature exceeding that of the semiconductor lattice. This carrier heating decreases the carrier mobility which is found to produce a corresponding decrease in conductivity. The above carrier concentration is used to insure that sufficient energy is available per carrier to produce the "hot carriers."

The injection of minority carriers is found to occur with injecting contacts at applied fields an order of magnitude lower than those required to produce carrier heating and increases the conductivity of the semiconductor by increasing the number of available carriers. It has been found that a carrier concentration of less than $10^{16}$ carriers per cubic centimeter permits the injected carriers to significantly vary the total number of carriers in the semiconductor for moderate control voltage ranges.

Further features and advantages of the invention will be more readily apparent from the following description of specific embodiments when taken in conjunction with the accompanying drawings, in which.

Figures 4A, 4B:
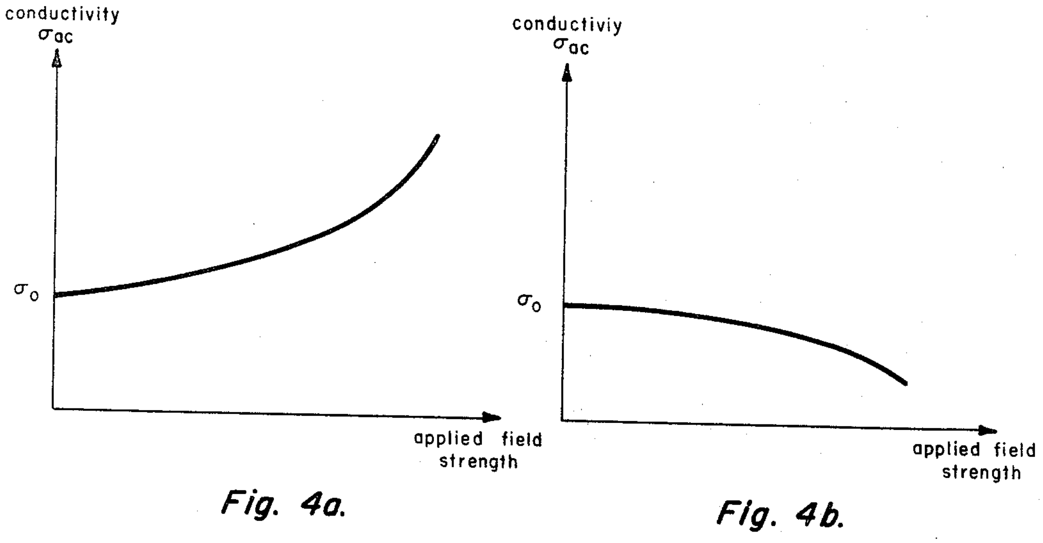
Figure 5:
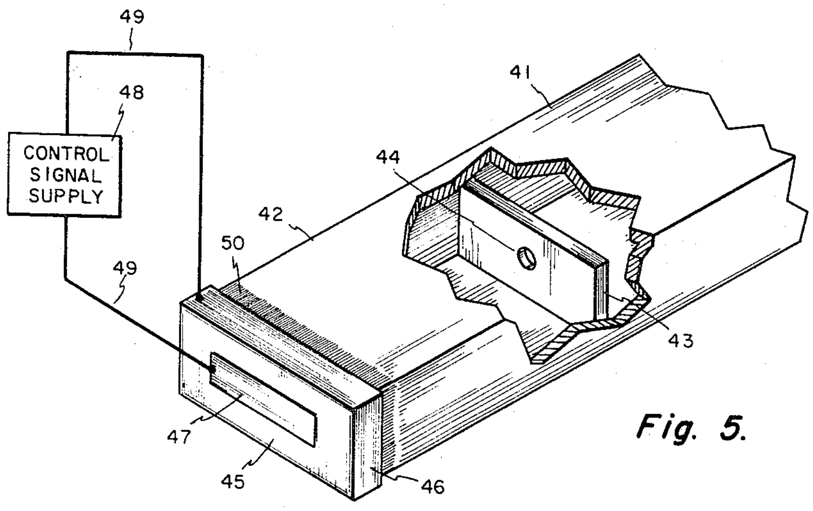

FIGS. 4*a* and 4*b* show variations in semiconductor conductivity with applied field strength for embodiments using injecting and ohmic contacts; and FIG. 5 is a cut-away perspective view of a rectangular embodiment of the invention.

Figure 1:
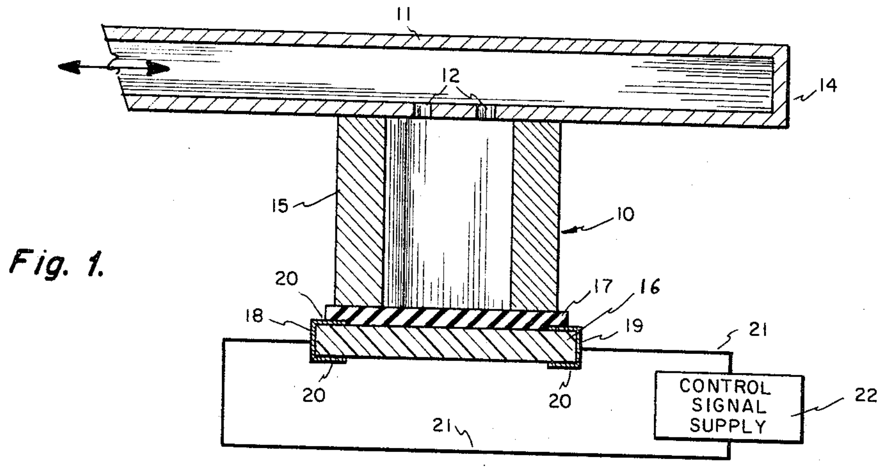
FIG. 1 is a side view in cross-section of a circular embodiment of the invention.

Referring more particularly to the embodiment shown in FIG. 1, a circular cavity 10 is shown coupled to waveguide 11 by coupling irises 12. Waveguide 11 is seen terminated by short-circuit end wall 14 located an odd multiple of quarter wavelengths from the axis of cavity 10. Irises 12 are equidistantly spaced on either side of the cavity axis so that the cavity is excited in the $TE_{01n}$ mole, where $n$ is any odd integer. This mode is characterized by the fact that the currents induced in the cavity end wall 16 are circularly symmetric about the cavity axis. The above described cavity coupling is well known in the art and other coupling means may be used if desired.

Cavity 10 is shown comprised of metal cylindrical wall 15 and semiconductor end wall 16 spaced therefrom by insulating wafer 17. Since no induced currents flow between cylindrical wall 15 and end wall 16, insulating wafer 17 does not disturb the modal pattern of the fields within the cavity. Wafer 17 insulates contacts 18 and 19 from cylindrical wall 15 and may be formed of "Mylar," mica or the like.

The thickness of semiconductor end wall 16 is chosen to be at least a skin depth at the frequency of the electromagnetic waves in the cavity. The skin depth is a function of the resistivity ($p$) and the permeability ($\mu$) of free space as well as the frequency of interest (F) and is expressed by the following equation:

$$\text{skin depth in meters}=\left[\frac{p}{\pi F\mu}\right]^{1/2}$$

For example, a semiconductor having a resistivity of 1 ohmmeter at 70 gigacycles has a skin depth of .0019 meter or 74.88 mils. By utilizing an end wall having a thickness of several skin depths, the losses occurring due to power leakage from the cavity are substantially lessened. Although a semiconductor end wall having a thickness less than a skin depth may be used, the power losses are found to be substantial.

Figure 2:
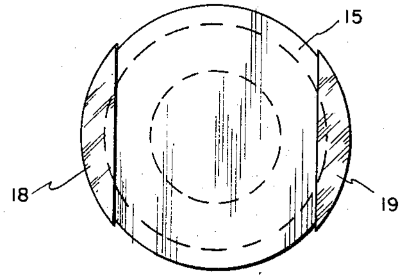
FIG. 2 is a bottom view showing the contact configuration of the embodiment of FIG. 1.

Semiconductor end wall 16 may be formed of germanium, silicon, indium antimonide, and the like and is selected to have a carrier concentration not exceeding $10^{16}$ carriers per cubic centimeter at room temperatures. In practice, the lower limit of the carrier concentration is found to be detemined by the carrier concentration of intrinsic semiconductor at the desired operating temperatures. This low carrier concentration is used to improve the sensitivity of the device for reasons that later become apparent. While an entire semiconductor wall is shown in FIGS. 1 and 2, it will be understood that only a portion of the cavity wall surface need be comprised of semiconductor. However, the sensitivity of the device will be decreased accordingly.

Contacts 18 and 19 are shown outside the portion of end wall 16 defining the inner dimension of cavity 10 and thus are outside the electromagnetic field region. The metallic contacts are affixed so as to contact opposing sections of end wall 16 as shown by FIG. 2. This configuration insures that the conductivity of the total wall area exposed to the cavity field may be varied by the applied electric field and thereby increases the sensitivity of the device. Increasing the contact size such that they extend into the field region will result in a decrease in sensitivity since the contacts have a substantially constant conductivity. Other contact configurations may be employed, for example, a center contact mounted on the outer face of end wall 16 and a perimeter contact has been found suitable. This contact configuration when used with a $TE_{01n}$ mode permits the insulating wafer 17 to be eliminated as the control voltage is no longer applied across the cylindrical wall 15.

The contacts 18 and 19 which may be either injecting or ohmic type contacts formed by electroplating, diffusing, alloying, or other techniques well known in the art, are connected by leads 21 to control signal supply 22 which may be a pulse generator or other control means depending on the operations to be performed. The control signal applied to contacts 18 and 19 produces an electric field within the semiconductor which varies the conductivity of end wall 16.

Figure 3:
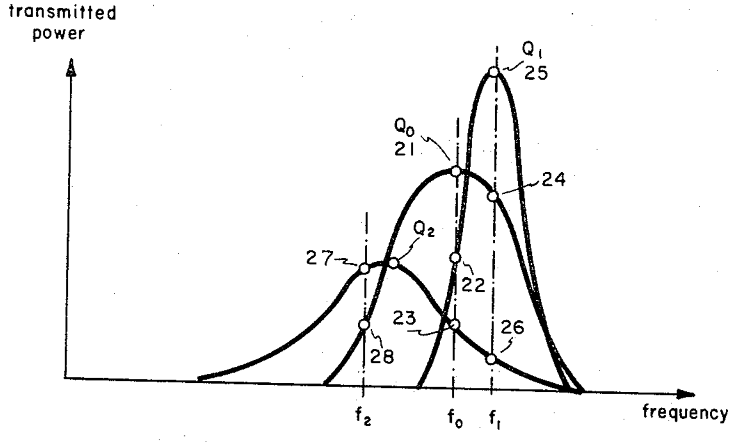
FIG. 3 is a graph showing representative transmission characteristics and resonant frequencies associated with the invention.

Referring to FIG. 3, the transmitted power output of circular cavity 10 may be determined for a particular operating frequency by reference to the appropriate cavity transmission characteristic. The characteristic presents the ratio of energy stored in the cavity to the energy lost or dissipated therein per cycle and is centered about the resonant frequency of the cavity.

The $Q_0$ transmission characteristic of FIG. 3 corresponds to the no-signal condition of circular cavity 10 where $f_0$ is the resonant frequency. By increasing the conductivity of end wall 16 through the injection of minority carriers by employing injecting type contacts as contacts 18 and 19, the resonant frequency of the cavity increases and the shape of the characteristic is narrowed and the peak amplitude raised as shown by the $Q_1$ characteristic of FIG. 3. However, if the operating frequency remains constant at $f_0$, the transmitted or output power has decreased from that of operating point 21 to that at operating point 22. If the operating frequency is initially $f_1$ for example, the transmitted power increases from operating point 24 to point 25 when a voltage is applied to the injecting contacts.

The curve of FIG. 4*a* shows the variation in A.C. conductivity $\sigma$ of semiconductor end wall 16 with the applied field strength for the embodiment employing injecting-type contacts 18 and 19. The initial conductivity $\sigma_0$ is dependent on the carrier concentration which is preferably chosen to be less than $10^{16}$ carriers per cubic centimeter at room temperature. This low level of carrier concentration permits the conductivity of the semiconductor end wall to be varied without using high power control voltage supplies for injection. The conductivity is a function of the total number of carries in the semiconductor and the use of a low initial conductivity $\sigma_0$ enhances the sensitivity of the device. In an embodiment using a germanium end wall injecting contacts and a carrier concentration of about $10^{14}$ carriers per cubic centimeter, significant variations in conductivity were obtained with a field strength on the order of 10 volts per centimeter.

The control voltage may be a pulse and as mentioned previously the transmitted output increases or decreases depending upon the initial operating frequency. Thus, the device is particularly well suited for pulse modulation techniques. Also, the application of a bias voltage may be used in conjunction with varying modulating signals to amplitude-modulate the electromagnetic waves in the cavity accordingly.

The $Q_2$ characteristic of FIG. 3 is representative of an embodiment in which contacts 18 and 19 are ohmic-type contacts. In this embodiment, the A.C. conductivity decreases from its no-signal value as the carriers in end wall 16 are heated to a temperature above that of the semiconductor lattice. These "hot carriers" are found to experience a decrease in mobility which is an inverse function of the applied field. This change in A.C. conductivity is shown by FIG. 4*b*. It is to be noted that the conductivity decreases to zero, this corresponds to the current saturation experienced by semiconductors, such as germanium, prior to reaching the avalanche breakdown voltage. For those semiconductors, such as indium antimonide, that do not reach saturation prior to breakdown, the A.C. conductivity does not reach zero. However, the initial part of the A.C. conductivity is substantially as shown in FIG. 4*b* for both types of semiconductors.

The ohmic contact embodiment can be operated in the same manner as the injecting-type. The $Q_2$ characteristic, corresponding to a decreased conductivity shows that at the initial resonant frequency $f_0$ of the cavity, the operating point changes from point 21 to point 23, thereby decreasing the transmitted power. Also, if the initial operating frequency is $f_2$ and the initial operating point 28, the decrease in conductivity produces an increase in the power output of the cavity as shown by point 27. It will be understood that the operating points referred to are dependent on the control signal and may be varied as desired.

The carrier concentration of the end wall 16 is chosen to be less than $10^{16}$ carriers per cubic centimeter at room temperature to permit the carriers therein to be heated without the necessity for employing high power supplies. The carriers absorb energy from the applied electric field and by limiting the number of carriers, the amount of energy available per carrier is increased for a particular field strength and the sensitivity of the device is increased. One embodiment using indium antimonide, tested and operated at liquid nitrogen temperatures to obtain a carrier concentration in the range of $10^{13}$ to $10^{14}$ carriers per cubic centimeter and at peak powers in the kilowatt range, was found to exhibit significant changes in conductivity for applied fields on the order of 100 volts per centimeter.

This embodiment is not limited by the time required for carrier recombination and its control frequency response is determined by the energy relaxation time constant $\tau_E$ of the carriers. The time constant is found to be on the order of $10^{-11}$ seconds and is indicative of the time required for the carriers to become "hot." Hence this embodiment permits modulation with control signals having a frequency up to the reciprocal of the time constant $\tau_E$ or well into the kilomegacycle range.

It is to be noted that for embodiments using either injecting or ohmic contacts, the contacts are not used to couple the electromagnetic power through the semiconductor end wall and therefore the power handling capabilities of the device are appreciably greater than known devices performing similar operations.

While the above discussion related to modulation, the device is suited for operation as a variable attenuator, filter or switch. The attenuation is produced by the application of a bias voltage to contacts 18 and 19 sufficient to lower the operating point so that the transmitted power is at the desired level. The controlled application and removal of this bias or pulse enables the transmitted power to be easily switched between two levels. For filtering operations, it is recognized that the application of the control voltage shifts the resonant frequency of the cavity which in turn moves the transmission characteristic and its pass-band along the frequency axis. Thus, once the device has been calibrated, the application of a particular control signal enables the power output of the cavity to be regulated and the frequency pass-band to be controlled. In addition, a plurality of cavities may be connected in cascade to increase the effects described above.

The circular cavity 10 of FIG. 1 is advantageously selected to resonate in the circular electric or $TE_{01n}$ mode. However, the invention may also be used for those modes wherein the induced high frequency current flows between the cavity end and side walls. This is shown by the rectangular embodiment of FIG. 5, wherein cavity 42 is formed as an extension of waveguide 41.

The cavity 42 is formed by iris plate 43 having an iris 44 of the type required to excite the desired mode in cavity 42 and is terminated by semiconductor end wall 45. Since rectangular cavity modes are characterized by current flow between end wall 45 and the adjacent side walls, ohmic contact 50 is formed at the connection thereof by alloying or diffusion techniques as known in the art. This enables semiconductor end wall 45 to be used without disturbing the modal pattern in cavity 42.

The contact geometry is shown coaxial in order to prevent the control voltage from being shorted out by the cavity side walls. Contact 46 is a perimeter contact mounted on the edge of end wall 45, while contact 47 is centrally located on the outer face thereof. The contacts may be either injecting or ohmic and the resultant changes in conductivity of end wall 45 are as previously described. Contacts 46 and 47 are connected through leads 49 to control signal supply 48. This embodiment of the invention performs modulation, attenuation, filtering or switching operations depending on the control signal applied to the contacts.

While the above discussion has described specific embodiments of the invention, it is noted that other cavity geometries and contact configurations may be employed and additional modifications may be made without departing from the spirit and scope of the invention.

What is claimed is:

1. Apparatus for modulating guided electromagnetic waves in accordance with a modulating signal which comprises (a) an electromagnetic cavity having a wall thereof formed of semiconductor material with a carrier concentration less than $10^{16}$ carriers per cubic centimeter, said wall having a thickness greater than a skin depth at the cavity frequency, (b) coupling means connected to said cavity for coupling electromagnetic waves therethrough, (c) a first metallic contact affixed to said semiconductor wall outside the electromagnetic field region of said cavity, (d) a second metallic contact affixed to said semiconductor wall outside the electromagnetic field region of said cavity and spaced from said first contact, (e) means for applying a modulating signal to said contacts to vary the conductivity of said semiconductor and provide a corresponding variation in the transmission characteristics of said cavity, said electromagnetic waves being modulated in accordance with said variations.

2. Apparatus for modulating guided electromagnetic waves in accordance with a modulating signal which comprises (a) an electromagnetic cavity having a wall thereof formed of semiconductor material with a carrier concentration less than $10^{16}$ carriers per cubic centimeter, said wall having a thickness greater than a skin depth at the cavity frequency, (b) coupling means connected to said cavity for coupling electromagnetic waves therethrough, (c) a first ohmic contact affixed to said semiconductor wall outside the electromagnetic field region of said cavity, (d) a second ohmic contact affixed to said semiconductor wall outside the electromagnetic field region of said cavity and spaced from said first contact, (e) means for applying a modulating signal to said contacts to vary the conductivity of said semiconductor and provide a corresponding variation in the transmission characteristics of said cavity, said electromagnetic waves being modulated in accordance with said variations.

3. Apparatus for modulating guided electromagnetic waves in accordance with a modulating signal which comprises (a) an electromagnetic cavity having a wall thereof formed of semiconductor material with a carrier concentration less than $10^{16}$ carriers per cubic centimeter, said wall having a thickness greater than a skin depth at the cavity frequency, (b) coupling means connected to said cavity for coupling electromagnetic waves therethrough, (c) a first injecting contact affixed to said semiconductor wall outside the electromagnetic field region of said cavity, (d) a second injecting contact affixed to said semiconductor wall outside the electromagnetic field region of said cavity and spaced from said first contact, (e) means for applying a modulating signal to said contacts to vary the conductivity of said semiconductor and provide a corresponding variation in the transmission characteristics of said cavity, said electromagnetic waves being modulated in accordance with said variations.

4. Apparatus for modulating guided electromagnetic waves in accordance with a modulating signal which comprises (a) an electromagnetic cavity having one wall thereof formed of semiconductor material with a carrier concentration less than $10^{16}$ carriers per cubic centimeter, said wall having a thickness greater than a skin depth at the cavity frequency, (b) coupling means connected to said cavity for coupling electromagnetic waves therethrough, (c) a first metallic contact affixed to said semiconductor wall outside the eletcromagnetic field region of said cavity, (d) a second metallic contact affixed to said semiconductor wall outside the electromagnetic field region of said cavity and spaced from said first contact, (e) means for insulating said contacts from the cavity walls adjacent said semiconductor wall, (f) means for applying a modulating signal to said contacts to vary the conductivity of said semiconductor wall and provide a corresponding variation in the transmission characteristics of said cavity, said electromagnetic waves being modulated in accordance with said variations.

5. Apparatus for modulating guided electromagnetic waves in accordance with a modulating signal which comprises (a) a circular electromagnetic cavity having an end wall thereof formed of semiconductor material with a carrier concentration less than $10^{16}$ carriers per cubic centimeter, said wall having a thickness greater than a skin depth at the frequency of interest, (b) coupling means connected to said cavity for coupling electromagnetic waves therethrough and adapted to the $TE_{01n}$ mode in said cavity at the frequency of interest, (c) a first metallic contact affixed about the periphery of said end wall, (d) a second metallic contact affixed to the center of the outer face of said end wall, (e) means for applying a modulating signal to said contacts to vary the conductivity of said semiconductor wall and provide a corresponding variation in the transmission characteristics of said cavity, said electromagnetic waves being modulated in accordance with said variations.

6. Apparatus for modulating electromagnetic waves in accordance with a modulating signal which comprises (a) a circular electromagnetic cavity having an end wall thereof formed of semiconductor material with a carrier concentration less than $10^{16}$ carriers per cubic centimeter, said wall having a thickness greater than a skin depth at the frequency of interest, (b) coupling means connected to said cavity for coupling electromagnetic waves therethrough and adapted to excite the $TE_{01n}$ mode in said cavity at the frequency of interest, (c) a first injecting contact affixed to a portion of the peripheral region of said semiconductor wall outside the electromagnetic field region of said cavity, (d) a second injecting contact affixed to an opposing portion of the peripheral region of said semiconductor wall outside the electromagnetic field region of said cavity, (e) means for insulating said contacts from the cylindrical wall of said cavity, and (f) means for applying a modulating signal to said contacts to vary the conductivity of said semiconductor wall and produce a corresponding variation in the transmission characteristics of said cavity, said electromagnetic waves being modulated in accordance with said variations.

7. Apparatus for modulating electromagnetic waves in accordance with a modulating signal which comprises (a) a circular electromagnetic cavity having an end wall thereof formed of semiconductor material with a carrier concentration less than $10^{16}$ carriers per cubic centimeter, said wall having a thickness greater than a skin depth at the frequency of interest, (b) coupling means connected to said cavity for coupling electromagnetic waves therethrough and adapted to excite the $TE_{01n}$ mode in said cavity at the frequency of interest, (c) a first ohmic contact affixed to a portion of the periphery region of said semiconductor wall outside the electromagnetic field region of said cavity, (d) a second ohmic contact affixed to an opposing portion of the peripheral region of said semiconductor wall outside the electromagnetic field region of said cavity, (e) means for insulating said contacts from the cylindrical wall of said cavity, and (f) means for applying a modulating signal to said contacts to vary the conductivity of said semiconductor wall and produce a corresponding variation in the transmission characteristics of said cavity, said electromagnetic waves being modulated in accordance with said variations.

8. Apparatus for modulating electromagnetic waves in accordance with a modulating signal which comprises (a) a rectangular electromagnetic cavity having an end wall thereof formed of semiconductor material with a carrier concentration less than $10^{16}$ carriers per cubic centimeter, said wall having a thickness greater than a skin depth at the frequency of interest, (b) an ohmic contact formed between said end wall and the adjacent cavity walls, (c) coupling means connected to said cavity for coupling electromagnetic waves therethrough, (d) a first injecting contact affixed to the perimeter of said end wall, (e) a second injecting contact affixed to the center of the outer face of said end wall, (f) means for applying a modulating signal to said contacts to vary the conductivity of said semiconductor wall and produce a corresponding variation in the transmission characteristics of said cavity, said electromagnetic waves being modulated in accordance with said variations.

9. Apparatus for modulating electromagnetic waves in accordance with a modulating signal which comprises (a) a rectangular electromagnetic cavity having an end wall thereof formed of semiconductor material with a carrier concentration less than $10^{16}$ carriers per cubic centimeter, said wall having a thickness greater than a skin depth at the frequency of interest, (b) an ohmic contact formed between said end wall and the adjacent cavity walls, (c) coupling means connected to said cavity for coupling electromagnetic waves therethrough, (d) a first ohmic contact affixed to the perimeter of said end wall, (e) a second ohmic contact affixed to the center of the outer face of said end wall, (f) means for applying a modulating signal to said contacts to vary the conductivity of said semiconductor wall and produce a corresponding variation in the transmission characteristics of said cavity, said electromagnetic waves being modulated in accordance with said variations.

References Cited

UNITED STATES PATENTS

| | | | |
|---|---|---|---|
| 2,974,223 | 3/1961 | Langberg | 332—29 X |
| 3,160,826 | 12/1964 | Marcatili | 333—83 X |
| 3,183,456 | 5/1965 | Seidel | 332—29 |

ROY LAKE, *Primary Examiner.*

ALFRED L. BRODY, *Examiner.*